US00H002214H

(19) United States

(12) Statutory Invention Registration (10) Reg. No.: US H2214 H

Kitt et al. (43) Published: Apr. 1, 2008

(54) METHOD AND SYSTEM FOR ACCESSING, MANAGING AND DEVELOPING INFORMATION REGARDING PHILANTHROPIC ORGANIZATIONS AND DONATIONS

(75) Inventors: Paula Kitt, Lenexa, KS (US); Larry Jacob, Kansas City, MO (US); Sonia Cruz, Kansas City, MO (US); Nancy Eggers, Independence, MO (US)

(73) Assignee: Greater Kansas City Community Foundation, Kansas City, MO (US)

(21) Appl. No.: 10/731,450

(22) Filed: Dec. 9, 2003

(65) Prior Publication Data

US 2005/0125245 A1 Jun. 9, 2005

(51) Int. Cl.
*G06F 17/60* (2006.01)

(52) U.S. Cl. ..... 705/1

(58) Field of Classification Search ..... None
See application file for complete search history.

(56) References Cited

PUBLICATIONS

NPO Solutions, Suggestion Central™, http://www.nposolutions.com/main/products/internet_services/Suggestion_Central.htm.
CFA/B2P, Impact Mgr™, http://www.cfamerica.org/page1576.cfm.
Arizona Community Foundation, dot.che™, http://www.dotche.org/static/who_we_are/about_dotche.shtml.
Guidestar, Guidestar Plus™, www.guidestar.org, www.guidestar.org.
BBB Wise Giving Alliance, National Charity Reports, http://www.give.org/reports/index.asp#S.
Independent Charities of America, Charity Reports http://www.independentcharities.org/search/findset.asp?Title=View+Our+Members.
American Institute of Philanthropy, Charity Rating Guide, http://www.charitywatch.org/ratingguide.html.
Fidelity Charitable Gift Fund, Fidelity–Branded Guidestar, http://www.charitablegift.org/resource/05_t3_eval_charities.shtml#.
Charity Navigator, Charity Search, http://www.charitynavigator.org/index.cfm/bay/search.alpha.htm.
Standard & Poor's, Charitable Organization Evaluation report.

*Primary Examiner*—Dan Pihulic
(74) *Attorney, Agent, or Firm*—Lara Dickey Lewis; Blackwell Sanders Peper Martin LLP

(57) ABSTRACT

A method for facilitating at least one donor's management of charitable monies held in at least one donor account is provided wherein the method includes the step of providing at least one central system having organization information regarding at least one philanthropic organization and donor account information regarding said at least one donor account. The next step includes inputting into said system a query requesting said organization information about said at least one philanthropic organization followed by retrieving and displaying said organization information. The method of present invention further includes inputting into said system a request to transfer said charitable monies from said donor account to said philanthropic organization and generating an order to transfer said charitable monies from said donor account to said philanthropic organization. The final step includes fulfilling the generated order to complete transfer of said monies.

36 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Fig. 6

Help
Log o
My Profi

Home | My Funds | Non-Profit Analysis | My Grants

DONORLINK

FUND INFORMATION instant access to your donor fund

- Fund Detail
- Overview
- Grant History
- Fund Balance
- Contributions
- Vouchers
- Investment Mix

- Contribute to My Fund
- Suggest a Grant

Demo Fund 1

Select a Different Fund

Fund Balance

More Info

| Period | Balance |
|---|---|
| Current | $462,015.97 |
| May 2003 | $478,199.99 |
| April 2003 | $462,562.44 |
| March 2003 | $457,321.94 |
| February 2002 | $468,158.63 |
| January 2002 | $456,187.52 |

Grant History

More Info

| Grant Date | Grantee Name | | Grant Amount | Paid | D/A | Issued/To Be Released |
|---|---|---|---|---|---|---|
| 5/07/03 | Kansas City Harmony | (Re-Grant) | $1,000.00 | Y | D | 5/07/03 |
| 3/04/03 | Cabot Westside Health Center | (Re-Grant) | $1,000.00 | Y | D | 3/04/03 |
| 9/18/02 | Arts Council of Metropolitan Kansas City | (Re-Grant) | $5,000.00 | Y | D | 9/18/02 |
| 5/17/02 | El Centro, Inc. | (Re-Grant) | $10,000.00 | Y | D | 5/17/02 |
| 3/20/02 | DeLaSalle Education Center | (Re-Grant) | $250.00 | Y | D | 3/20/02 |

Contribution History

More Info

| Donor | Gift Amount | Non-Gift Amount | Total Amount | Gift Date | Gift Type |
|---|---|---|---|---|---|
| Acme Development Institute | $50,000.00 | $0.00 | $50,000.00 | 5/21/98 | cash |
| Acme Development Institute | $50,000.00 | $0.00 | $50,000.00 | 5/22/97 | cash |

METHOD AND SYSTEM FOR ACCESSING, MANAGING AND DEVELOPING INFORMATION REGARDING PHILANTHROPIC ORGANIZATIONS AND DONATIONS

BACKGROUND OF THE INVENTION

The present invention is directed to a method that combines real-world research and online access to provide financial donors with insight into charitable or philanthropic organizations including such organizations' finances, operations and programs.

Community foundations, and other charitable or philanthropic organizations, work to improve the quality of life in particular communities through partnership with financial donors. Many community foundations have discovered that such positive change occurs more rapidly and is more effectively directed to areas of particular need in the community when charitable monies are combined, managed, and donated where appropriate. Accordingly, funds have been created wherein each particular fund is dedicated to a particular charitable organization or category of organizations. For example, a fund may be dedicated to a local homeless shelter or to all homeless shelters in the community. These funds may be started by individuals, businesses and non-profit organizations alike. The community foundation manages these funds and provides strategic planning to enable donors to make decisions as to where charitable monies would best be used.

Most donors have particular interests and prefer to direct their charitable monies to particular organizations or a particular group of organizations. However, in order to choose, for example, one homeless shelter over another homeless shelter as the receipt of the donor's monies, the donor needs sufficient information to make an intelligent decision so that the monies are directed to the shelter that is most likely to utilize such monies effectively. It is desirable, therefore, to provide donors with information regarding many different charitable or philanthropic organizations and allow the donors to manage their contributions through intelligent decision-making and giving.

Accordingly, there is need in the art for a user-friendly method for gathering intelligence regarding particular charitable or philanthropic organizations that would be useful to a donor seeking to donate charitable monies in an effective manner so as to create positive change. There is also a need in the art for a user-friendly method of distributing such information to donors and potential donors and for allowing donors to actively manage their funds and donations.

BRIEF SUMMARY OF THE INVENTION

A method for facilitating at least one donor's management of charitable monies held in at least one donor account is provided wherein the method includes the step of providing at least one central system having organization information regarding at least one philanthropic organization and donor account information regarding said at least one donor account. The next step includes inputting into said system a query requesting said organization information about said at least one philanthropic organization followed by retrieving and displaying said organization information. The method of present invention further includes inputting into said system a request to transfer said charitable monies from said donor account to said philanthropic organization and generating an order to transfer said charitable monies from said donor account to said philanthropic organization. The final step includes fulfilling the generated order to complete transfer of said monies.

The present invention further includes a method for developing information regarding philanthropic organizations. The method includes gathering information regarding at least one philanthropic organization, interviewing the philanthropic organization, confirming the information during the interviewing step, assessing the information, and inputting the information into a central repository.

Another embodiment of the present invention includes a method for providing information regarding philanthropic organizations to a donor. The method includes the steps of providing a donor interface, logging on to a central controller from the donor interface, establishing a communication link with the central controller, inputting philanthropic organization search criteria, providing data regarding at least one philanthropic organization wherein the data corresponds to the search criteria, and transmitting the data to the donor interface.

BRIEF DESCRIPTION OF SEVERAL VIEWS OF THE DRAWING

FIGS. 5–9 are illustrative screen shots of one embodiment of the present invention.

DETAILED DESCRIPTION OF THE INVENTION

Figure 1:
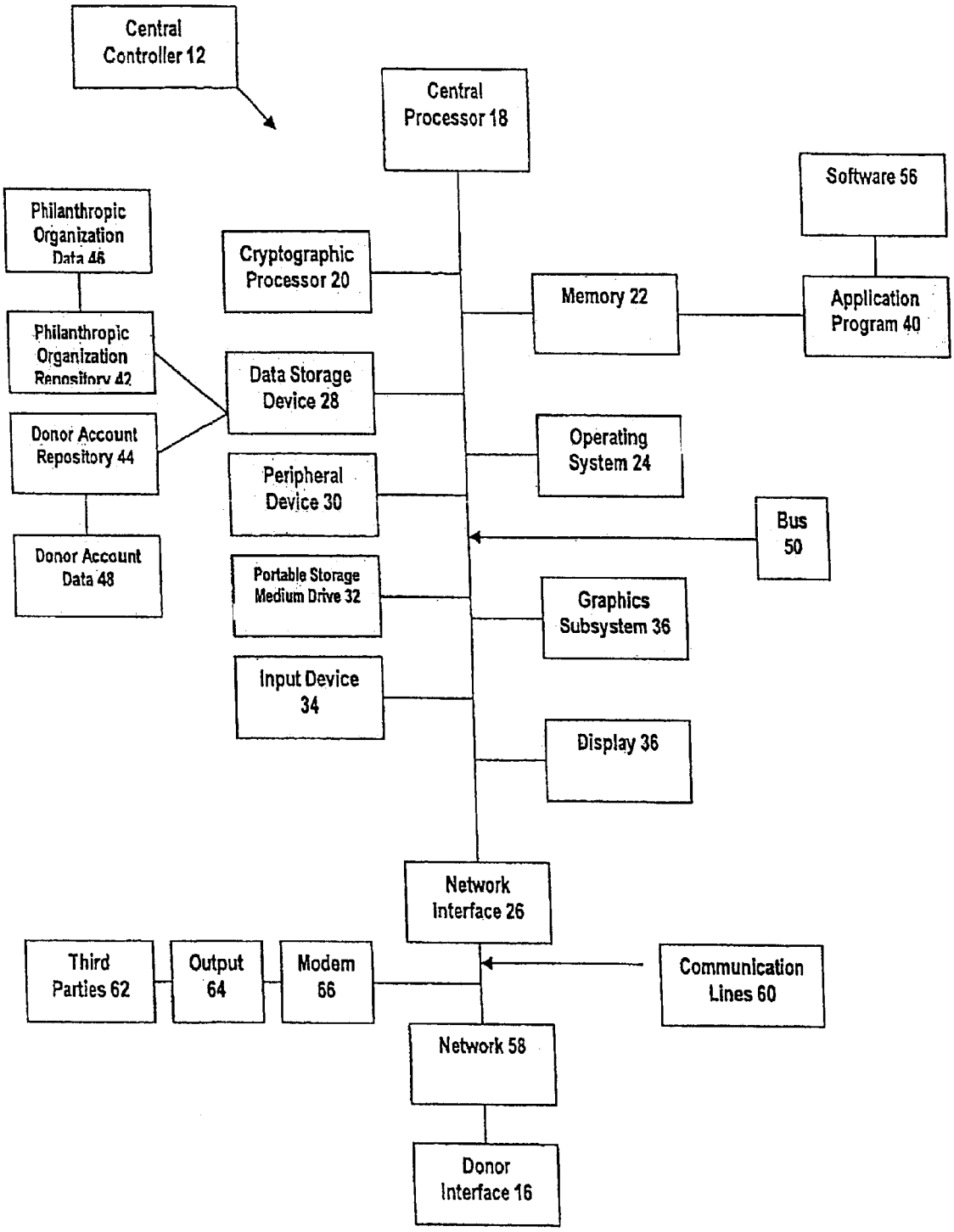
FIG. 1 is a flowchart of the central controller of the present invention.

The donation management system 10 of the present invention includes a central controller 12, a transmission means 14, and a donor interface 16. As used herein, a donor may be an individual, a corporation, a partnership, a government, or any other entity. FIG. 1 illustrates a high-level block diagram of central controller 12 which may used to implement the method of the present invention. Central controller 12 includes a central processor 18, an optional cryptographic processor 20, memory 22, operating system 24, network interface 26, data storage device 28, peripheral device(s) 30, portable storage medium drive(s) 32, input device(s) 34, graphics subsystem 36, and display 38. The components of central controller 12 are those typically found in general purpose computer systems, and are intended to represent a broad category of such computer components that are well known in the art.

In one embodiment, central controller 12 may be a conventional personal computer or computer workstation with sufficient memory and processing capability to perform the necessary functions of the present invention. In another embodiment, central controller 12 operates as a web server, both receiving and transmitting queries and requests generated by donors or philanthropic organizations. Regardless of its architecture, central controller 12 must be capable of high volume transaction processing and performing a significant number of mathematical calculations in processing communications and repository searches. One skilled in the art will also appreciate that the functionality of central controller 12 may also be distributed over a plurality of computers such as network of computers or a plurality of stand-alone computers. Central controller 12 may be configured in a distributed architecture wherein the repositories and processors are housed in separate units or locations. Some controllers perform the primary processing functions and contain, at a minimum, both memory and a general processor. Each of these controllers is attached to a WAN hub which serves as the primary communication link with the other controllers and interface devices. The WAN hub may have minimal processing capability itself, serving primarily as a communications router. Those skilled in the art will appreciate that an almost unlimited number of controllers may be supported. This arrangement yields a more dynamic and flexible system that is less prone to catastrophic hardware failures affecting the entire system.

Central processor 18 may contain a single microprocessor or it may contain a plurality of microprocessors for configuring central controller 12 as a multi-processor system. Examples of currently available processors that may be suitable as central processor 18 include 64 bit AMD opteron and 64 bit Itanium from Intel. Equivalent processors may also be used. However, one skilled in the art will appreciate that newer and faster models will be developed and would be suitable for use in the present invention.

Cryptographic processor 20 is a processor that supports the authentication of communications from and to donors, philanthropic organizations, and central controller 12. Cryptographic processor 20 is also suitable for providing anonymity in transactions, secure processing of electronic transactions, secure electronic data interchange (EDI), Internet commerce servers and all other applications that require high-volume transactions and maximum security. Examples of suitable, currently available apparatus include the IBM® PCI Cryptographic Coprocessor, the Okiok RAC/MIX ICP Cryptographic Processor and the like. Equivalent processors may also be used. However, one skilled in the art will appreciate that newer and faster models will be developed and would be suitable for use in the present invention.

Memory 22 includes random access memory (RAM), dynamic random access memory (DRAM), read-only memory (ROM) as well as high-speed cache memory. Memory 22 may also include an application program 40 that stores, in part, instructions and data for execution by central processor 18. If the system 10 of the present invention is wholly or partially implemented in software, including a computer program, memory 22 stores the executable code when in operation.

Controller 12, as shown in FIG. 1, illustrates operating system 24 as a Windows®-based platform available from Microsoft Corporation that may be used for implementing the method of the present invention. However, numerous other platforms can also suffice for use as operating system 24, such as Macintosh-based platforms available from Apple Computer, Inc., platforms with different bus configurations, networked platforms, multi-processor platforms, other personal computers, personal digital assistants (e.g., Palm Pilot®, Blackberry®, Clié®, 3Com, etc.), workstations, mainframes, navigation systems, and the like.

Network interface 26 is the gateway to communication with donors through the donor interface 16 as well as with other users of system 10. Network interface 26 may be a network interface card for interfacing central controller 12 to a network, a modem, or the like. Conventional internal or external modems may also serve as network interface 26. Network interface 26 supports modems at a range of baud rates from 1200 upward, but may combine such inputs into a T1 or T3 line if more bandwidth is required. In a preferred embodiment, network interface 26 is connected with the Internet and/or any of the commercial on-line services such as America Online, MSN, etc., allowing donors and other users access from a wide range of on-line connections. Several commercial electronic mail servers include the above functionality in, for example, mail software packages designed to link people and information over enterprise networks and the Internet. These types of products are platform independent and utilize open standards based upon Internet protocols. Users can exchange messages with enclosures such as files, graphics, video and audio. The system also supports multiple languages. Alternatively, network interface 26 may be configured as a voice mail interface, web site, BBS, or electronic mail address.

Data storage device is a non-volatile storage device for storing data, software and instructions for use by central processor 18 and is typically implemented with a magnetic disk drive or an optical disk drive. Data storage device 28 also contains data repositories used in the processing of transactions in the present invention, including a philanthropic organization repository 42 and a donor account repository 44. Philanthropic organization repository 42 maintains data 46 on philanthropic organizations with fields such as name, address, telephone number, mission statements, impact statements, backgrounds, histories, executive director statements, geographic information, management information, goverance information, board of directors information, organizational infrastructure information, board of directors demographics, board of directors and management biographies, awards, recognition, national affiliations, related organizations, educations, diversity, staffing, contractors, volunteers, financial history, revenue sources, resource allocations, programs, committees, recommendations, reviews, and strategic plans. Donor account repository 44 maintains account data 48 for individual donors such as donor fund balance, grant history, donation history, contribution history, vouchers, investments, and associated philanthropic organization information. As one skilled in the art will appreciate, any suitable type of software may be used to create and manage these repositories.

In another embodiment, data storage device 28 may also store application program 40 or the purpose of loading program 40 to memory 22. Computer software, instructions or data, including data 46 and 48, may also be stored in central processor 18 rather than data storage device 28.

Controller 12 may further include peripheral device(s) 34, portable storage medium drive(s) 36, input device(s) 38, graphics subsystem 40 and display 42. For purposes of simplicity, the components shown in FIG. 1 are depicted as being connected via a single bus 50 However, one skilled in the art will appreciate that the components may be connected through one or more data transport means. For example, processor 18 and memory 22 may be connected via a local microprocessor bus, and data storage device 28, peripheral device(s) 30, portable storage medium drive(s) 32, and graphics subsystem 36 may be connected via one or more input/output (I/O) buses.

Peripheral device(s) 30 may include any piece of hardware or computer support device, such as an input/output (I/O) interface, used to add additional functionality to central controller 12. Other examples of peripheral device(s) 30 include, but are not limited to, printers, scanners, disk and tape drives, microphones, speakers, joysticks, plotters, and cameras.

Portable storage medium drive(s) 32 operates in conjunction with a portable non-volatile storage medium, such as floppy disk, CD-ROM, or other computer-readable medium, to input and output data and code to and from central controller 12. In one embodiment, program 40 or data 46 and 48 is stored on a portable medium, and is then inputted to central controller 12 via portable storage medium drive 32.

Input device(s) 34 provides a portion of a user interface with central controller 12. Input device(s) 34 may include an alpha-numeric keypad for inputting alphanumeric and other key information, or a pointing device, such as a mouse, a trackball, stylus, wheel, cursor or direction keys. Such devices provide additional means for interfacing with repositories 42 and 44.

In order to display textual and graphical information, central controller 12 includes graphics subsystem 36 and display 38. Graphics subsystem 36 receives textual and graphical information and processes the information for output to display 38. Display 38 may include a cathode ray tube (CRT) display, liquid crystal display (LCD), projection displays, other suitable display devices, or means for displaying, that enables a user to view data. Display 38 can be used to display data, component interfaces and/or display other information that is part of a user interface.

In a further embodiment, the present invention also includes a computer program 52 that includes a storage medium (media) component having instructions stored thereon which can be used to program a computer to perform the method of the present invention. The storage medium can include, but is not limited to, any type of computer-readable medium including floppy disks, optical disks, DVD, CD-ROMs, magnetic optical disks, RAMs, EPROM, EEPROM, magnetic or optical cards, or any type of media suitable for storing electronic instructions.

Stored on any one of the computer-readable medium (media), the present invention may also include software 54 for controlling both the hardware of central controller 12 or processors 18 and 20, and for enabling central controller 12, processor 18 and cryptographic processor 20 to interact with a human user or other mechanism utilizing the results of the present invention. Software 54 may include, but is not limited to, device drivers, operating systems and user applications. Ultimately, such computer-readable media further includes donor management software 56 for performing the method of the present invention. In a preferred embodiment, software 56 is downloaded to central controller 12 and stored in memory 22 as part of application program 40. For the purposes of simplicity, all references herein to application program 40 include software 56. However, it will be appreciated by those skilled in the art that software 56 may also be stored and executed separately from application 40.

As illustrated in FIG. 1, central controller 12 is connected via network interface 26 to transmission means 14 such as a network 48 (e.g., an intranet, the Internet, or other network), across communications lines 60. Preferably, communications lines 60 are dedicated lines (e.g., LAN, WAN, standard dial-out telephone line, satellite, dedicated lease line, DSL) with a frame relay (or point-to-point) connection. Central controller 12 may also be directly linked to third party computer systems 62 rather than communicating with central controller 12 through network 48. Third party computer system 62 may be, for example, a mainframe or PCs of at least XX486 processing ability (e.g., Pentium CPU) having at least one gigabyte drive, 16 megabytes of RAM, with typical I/O accessories including a keyboard, mouse, and printer or similar workstation. Each third party computer system 62 and central controller 12 and, more specifically, an output device or a server 64, also have a modem 66 (e.g., CSDSU, T1 communication, DSL, satellite or cable modems) for coupling to communication lines 60 and enabling communications between central controller 12 and third party computer system 62.

Data storage device 28, output device or server 64 and memory 22 may be implemented by one digital processor 18. In that case, consolidation, scheduling, initial and subsequent segmenting of end users and execution of working programs are accomplished through the one processor 18. In using the present invention, end users may be assisted by a third party. Alternately, rule-based expert systems may be similarly employed in the present invention to provide dynamic end user behavioral and characteristics segmentation.

In a preferred embodiment, donor interface 16 is a conventional personal computer having, at a minimum, an input device, such as a keyboard, mouse or conventional voice recognition software package, a display device, such as a video monitor, a processing device such as a CPU, and a network interface such as a modem. A cryptographic processor may also be included for stronger authentication protection. These devices interface with central controller 12. Alternatively, donor interface 16 may also be a voice mail system, or other electronic or voice communications system such as a PDA, digital telephone, pocket personal computer or the like.

Figure 2:
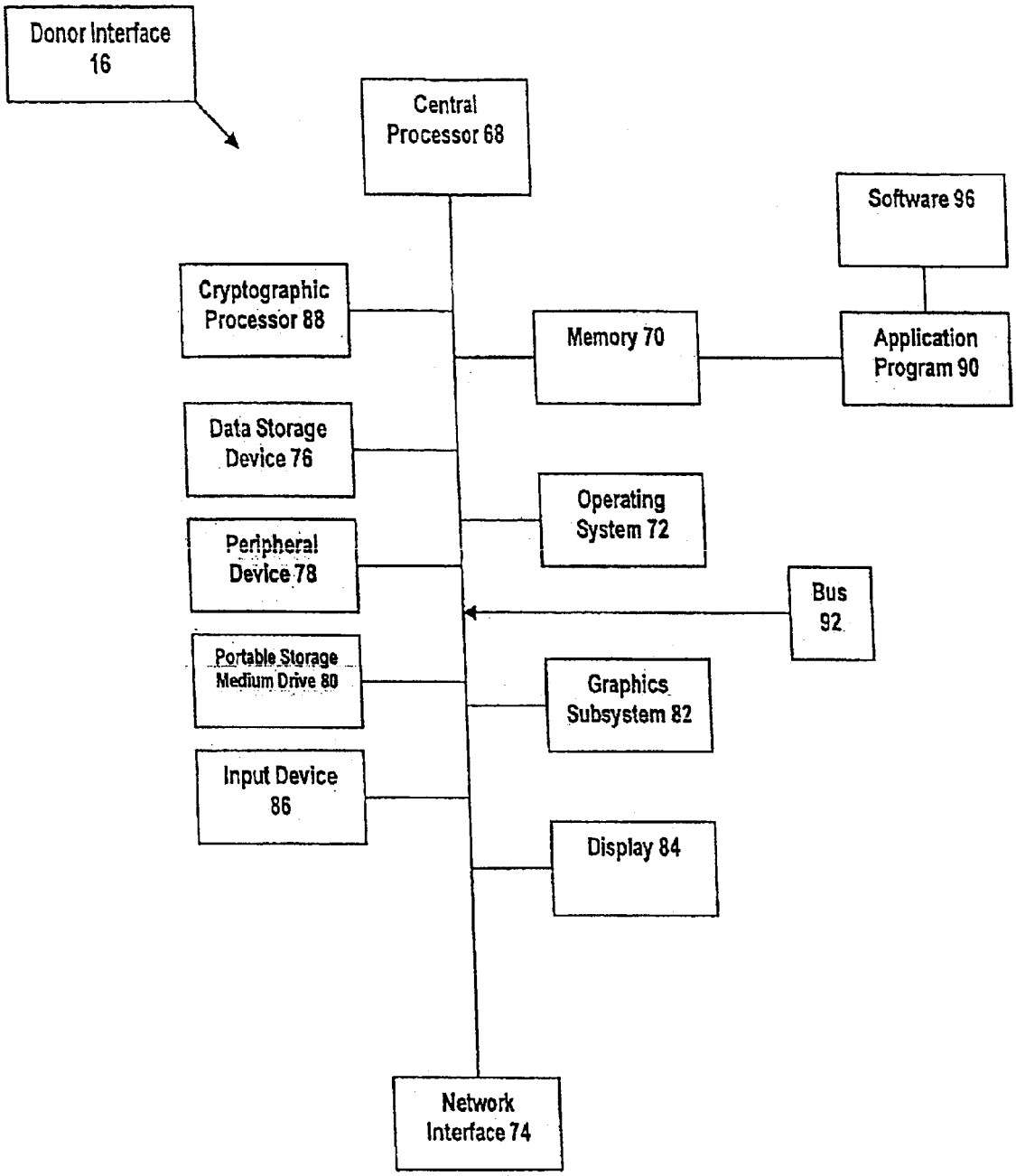
FIG. 2 is a flowchart of the donor interface of the present invention.

Referring now to FIG. 2, donor interface 16 is described in more detail. Donor interface 16 includes a central processor 68, a memory 70, an operating system 72, a network interface 74, a data storage device 76, a peripheral device(s) 78, a portable storage medium drive(s) 80, a graphics subsystem 82, a display 84, and an input device(s) 86. Cryptographic processor 88 may also be added for stronger authentication and verification capabilities.

Central processor 68 may contain a single microprocessor, such as a Pentium microprocessor, or it may contain a plurality of microprocessors for configuring donor interface 16 as a multi-processor system. Cryptographic processor 88 is a processor that supports the authentication of communications to and from donor interface 16 and central controller 12. Cryptographic processor 20 is also suitable for providing anonymity in transactions, secure processing of electronic transactions, secure electronic data interchange (EDI), Internet commerce servers and all other applications that require high-volume transactions and maximum security. Examples of suitable, currently available apparatus include the IBM®PCI Cryptographic Coprocessor, the Okiok RAC/MIX ICP Cryptographic Processor and the like. Equivalent processors may also be used. However, one skilled in the art will appreciate that new and faster models will be developed and would be suitable for use in the present invention.

Memory 70 includes random access memory (RAM), dynamic random access memory (DRAM), read-only memory (ROM) as well as high-speed cache memory. Memory 70 may also include an application program 90 that stores, in part, instructions and data for execution by central processor 68. If donor interface 16 is wholly or partially implemented in software, including a computer program, memory 70 also stores the executable code when in operation. Operating system 72 is shown in FIG. 2 as a Windows®-based platform available from Microsoft Corporation. However, numerous other platforms can also suffice for use as operating system 72, such as Macintosh-based platforms available from Apple Computer, Inc., platforms with different bus configurations, networked platforms, multi-processor platforms, other personal computers, personal digital assistants (e.g., Palm Pilot®, Blackberry®, Clic®, 3Com, etc.), workstations, mainframes, navigation systems, and the like.

Network interface 74 is the gateway to communication with central controller 12. Network interface 74 may be a network interface card for interfacing donor interface 16 to a network, a modem, or the like. Conventional internal or external modems may also serve as network interface 74. Network interface in a preferred embodiment, network interface 74 is connected with the Internet and/or any of the commercial on-line services such as America Online, MSN, etc., allowing donors and other users access to central controller 12 from a wide range of on-line connections. Several commercial electronic mail servers include the above functionality in, for example, mail software packages designed to link people and information over enterprise networks and the Internet. These types of products are platform independent and utilize open standards based upon Internet protocols. Users can exchange messages with enclosures such as files, graphics, video and audio. The system also supports multiple languages. Alternatively, network interface 74 may be configured as a voice mail interface, web site, BBS, or electronic mail address.

Data storage device 76 is a non-volatile storage device for storing data, software and instructions for use by central processor 68 and is typically implemented with a magnetic disk drive or an optical disk drive. Data storage device 76 may be used for archiving philanthropic organization data 46 or donor account data 48. In another embodiment, data storage device 76 may also store application program 90 for the purpose of loading program 90 to memory 70. Computer software, instructions or data, including data 46 and 48, may also be stored in central processor 68 rather than data storage device 76.

Donor interface 16 may further include peripheral device(s) 78, portable storage medium drive(s) 80, graphics subsystem 82, display 84, and input device(s) 86. For purposes of simplicity, the components shown in FIG. X are depicted as being connected via a single bus 92. However, one skilled in the art will appreciate that the components may be connected through one or more data transport means. For example, processor 68 and memory 70 may be connected via a local microprocessor bus, and data storage device 76, peripheral device(s) 78, portable storage medium drive(s) 80, and graphics subsystem 82 may be connected via one or more input/output (I/O) buses.

Peripheral device(s) 78 may include any piece of hardware or computer support device, such as an input/output (I/O) interface, used to add additional functionality to donor interface 16. Other examples of peripheral device 78 include, but are not limited to, printers, scanners, disk and tape drives, microphones, speakers, joysticks, plotters, and cameras.

Portable storage medium drive 80 operates in conjunction with a portable non-volatile storage medium, such as a floppy disk, CD-ROM, or other computer-readable medium, to input and output data and code to and from donor interface 16. Program 90 or data 46 and 48 may be stored on a portable medium, and then inputted to donor interface 16 via portable storage medium drive 80.

In order to display textual and graphical information, donor interface 16 includes graphics subsystem 82 and display 84. Graphics subsystem 82 receives textual and graphical information and processes the information for output to display 84. Display 84 may include a cathode ray tube (CRT) display, liquid crystal display (LCD), projection displays, other suitable display devices, or means for displaying, that enables a user to view data. Display 84 can be used to display data, component interfaces and/or display other information that is part of a user interface.

Input device(s) 86 provides a portion of a user interface with donor interface 16. Input device(s) 86 may include an alpha-numeric keypad for inputting alphanumeric and other key information, or a pointing device, such as a mouse, a trackball, stylus, wheel, cursor or direction keys. Such devices provide additional means for interfacing with donor interface 16 and, ultimately, central controller 12.

In a further embodiment, the present invention also includes a computer program 94 that includes a storage medium (media) component having instructions stored thereon which can be used to program a computer to perform the method of the present invention. The storage medium can include, but is not limited to, any type of computer-readable medium including floppy disks, optical disks, DVD, CD-ROMs, magnetic optical disks, RAMs, EPROM, EEPROM, magnetic or optical cards, or any type of media suitable for storing electronic instructions.

Stored on any one of the computer-readable medium (media), the present invention may also include software 96 for controlling both the hardware of donor interface 16 or processors 68 and 88, and for enabling donor interface 16, processors 68 and 88 to interact with a human user or other mechanism utilizing the results of the present invention. Software 54 may include, but is not limited to, device drivers, operating systems and user applications. Ultimately, such computer-readable media may further includes donor management software 98 for performing the method of the present invention.

Many commercial software applications are available to enable the communications required by donor interface 16. When central controller 12 acts as a web server, conventional communications software such as the Internet Explorer web browser from Microsoft Corporation or the Netscape Navigator® web browser from Netscape Corporation may also be used. No proprietary software is required.

Figure 3:
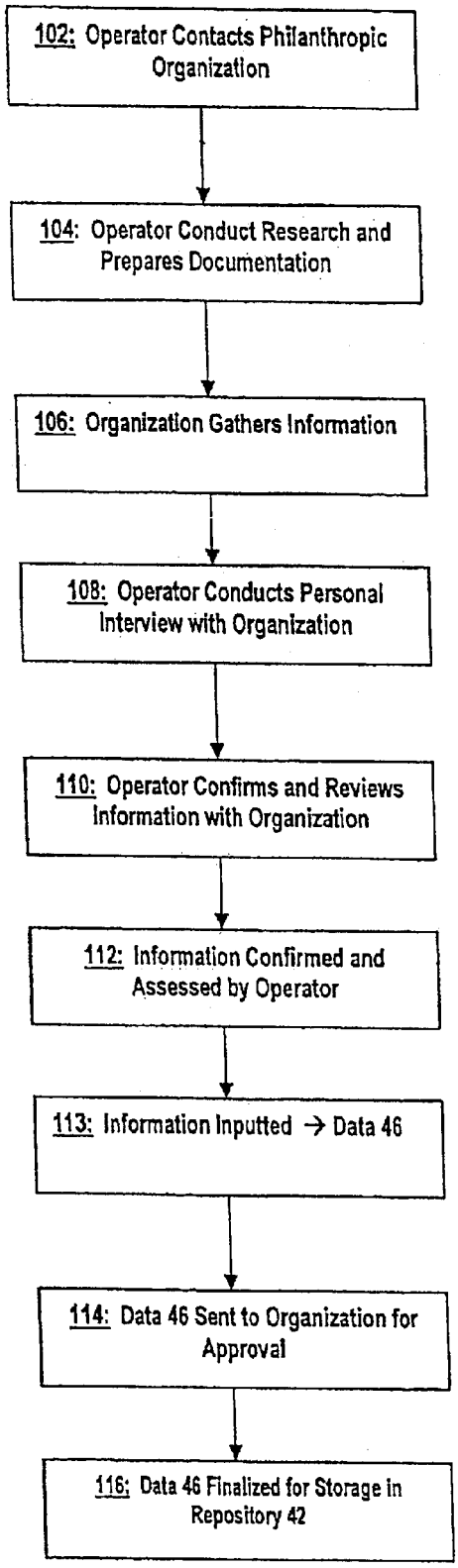
FIG. 3 is a flowchart of the steps of the method of the present invention.

The present invention also provides a method for developing, accessing and managing information regarding philanthropic organizations and enabling donations thereto by donors. The preferred method includes inputting desirable philanthropic organization data 46 into central controller 12 wherein data 46 is collected and stored in philanthropic organization repository 42. Philanthropic organization data 46 is collected, inputted, and stored in such a way as to correspond to a specific philanthropic organization. Referring now to FIG. 3, more particularly, an operator of central controller 12 or other persons associated with the operator or under the operator's direction (collectively the "operator") first makes contact with a particular philanthropic organization via personal contact, telephone, electronic messaging, facsimile transmission or the like to request an appointment and interview as shown in step 102. The operator then conducts any necessary research into the organization and prepares any necessary documentation or paperwork preparatory to the appointment at step 104. Simultaneously, the organization gathers or prepares information for use by the operator in hard copy or electronic form at step 106. At step 108, the operator conducts a personal interview with a representative of the organization such as the President, Vice-President, Chairman of the Board, CEO, CFO or the like. During the interview, the operator confirms information already gathered and reviews information provided by the organization as shown in step 110. The information may include, but is not limited to, the organization's name, address, telephone number, mission statements, impact statements, backgrounds, histories, executive director statements, geographic information, management information, governance information, board of directors information, organizational infrastructure information, board of directors demographics, board of directors and management biographies, awards, recognition, national affiliations, related organizations, educations, diversity, staffing, contractors, volunteers, financial history, revenue sources, resource allocations, programs, committees, recommendations, reviews, and strategic plans. The information developed, gathered or provided regarding the organization is then confirmed and assessed by the operator for suitability for inclusion into operator's method at step 112. Assessment of the information includes, but is not limited to, the organization's future and current needs and risks, outcomes, measures, fund or donation development, leadership development, interest in setting up an endowment, fund or other accounting service, and the like. The information or data is then inputted into central controller 12 for inclusion in philanthropic organization repository 42 as philanthropic organization data 46 at step 113. Data 46 is then sent via any communications means to the organization for review, confirmation and approval at step 114. Upon receipt of the organization's approval, at step 116, data 46 is finalized for storage in repository 42 and for use in the method of the present invention. One skilled in the art will appreciate that any type of software or hardware suitable for conducting steps 102–116 may be used in accordance with the present invention.

In use, application program 40 instructs central controller 12 to connect to transmission means 14 via network interface 26 and sends philanthropic organization data 46 to donor interface 16 which is then displayed for the donor in order to aid the donor's management of charitable funds. Both audio and visual data may be included in data 46 and transmitted in such a manner. Similarly, desired donor account data 48 may be inputted into central controller 12 and application program 40 wherein donor account data 48 is collected in such a way as to correspond to a specific donor. Application program 40 then connects to transmission means 14 via network interface 26 and sends donor account data 48 to donor interface 16 which is then displayed for the donor in order to aid the donor's management of charitable funds.

In accordance with the method of the present invention, when central controller 12 acts as a web server, a donor logs on to the central controller 12, makes queries or requests regarding philanthropic organizations or the donor's account, and then disconnects from the network. Central controller 12 is connected to a corresponding web site on the Internet thereby allowing the donor to provide and request information through the interface of conventional web browser software such as Internet Explorer from Microsoft Corporation. The web site has a home page with topic selections and links (e.g., hypertext HTML technology) to application program 40 thereby triggering searches and initiating transfer of data 46 and 48 and other desired information. In particular, for each topic or field selection there is a respective hyperlink to application program 40 and optionally an event for initiating program 40. Upon the donor's selection of a topic from the web page page, the present invention applies the linked event, if any. If the criteria of the event are met (or there is no initiating event), then the present invention executes the corresponding application program 40.

Figure 4:
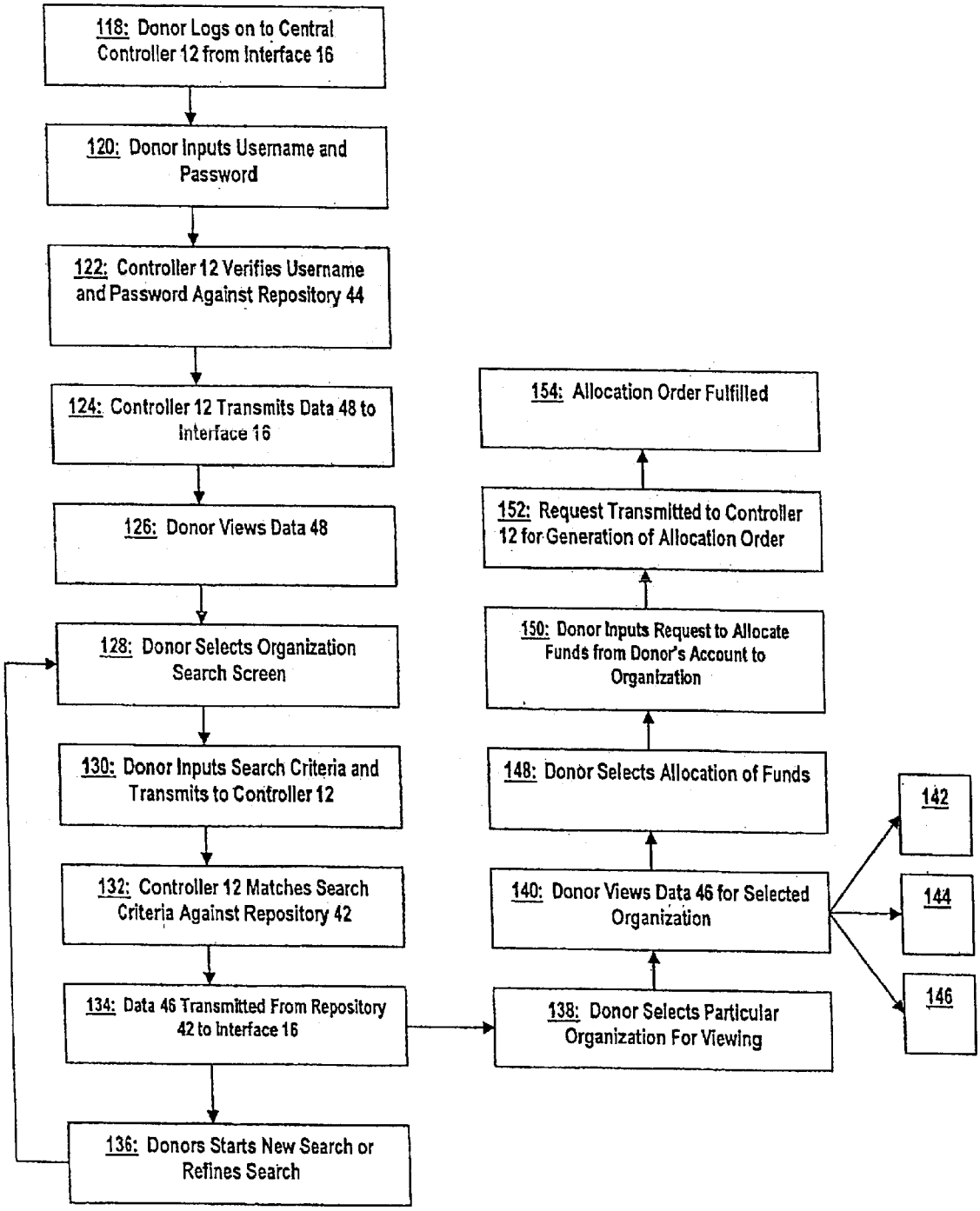
FIG. 4 is a flowchart of the steps of the method of the present invention.
Figure 5:
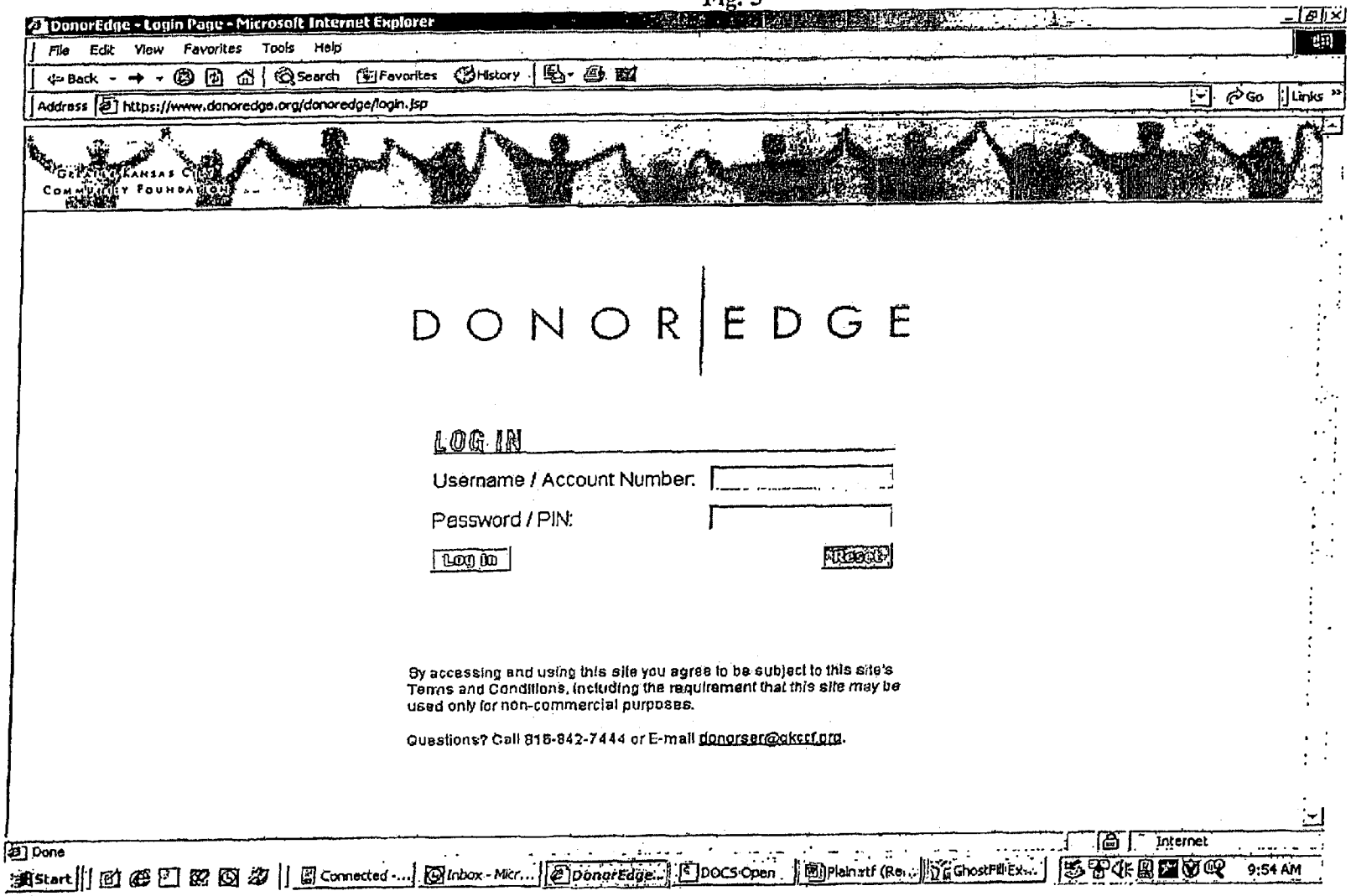

Referring now to FIGS. 4–6, a process is described by which a donor accesses data 46 and 48. It will be appreciated by those skilled in the art that buttons or drop-down menus may be provided on the web page for ease of selection and linking to appropriate web pages during performance of the method of the present invention. The donor logs on to central controller 12 using network interface 74 of donor interface 16 thereby establishing a communication link as shown in step 118. A unique username and password may be provided to the donor which allows information particular to the donor to be made available for viewing by the donor. The donor inputs an assigned username and password into appropriate fields on the web page at step 120 and the donor's identity is verified by transmitting the information to central controller 12 which then matches the username and password against a particular account in donor account repository 44 at step 122. A representative screen shot of the donor log-in page is shown in FIG. 5. If a correct username and password has been provided by the donor, at step 124, central controller 12 transmits that portion of donor account data 48 that corresponds to the donor's account information to donor interface 16. The donor may then select to view its account information including, but not limited to, the account's balance, grant history, contribution history, vouchers, and investments as shown in step 126. The donor may also choose during this step to transfer additional monies into the account or provide suggestions regarding donations to particular philanthropic organizations.

Figure 7:
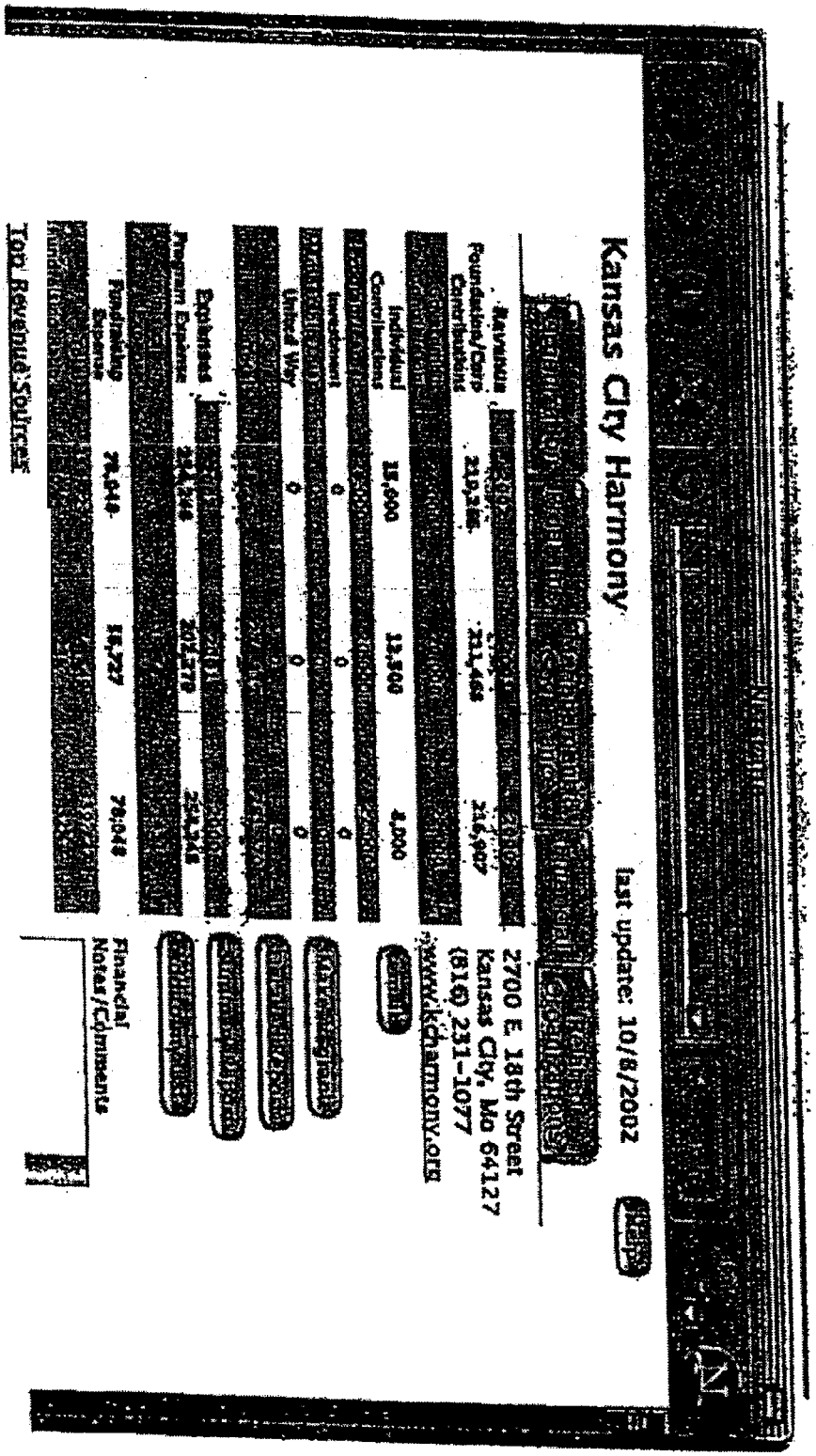
Figure 8:
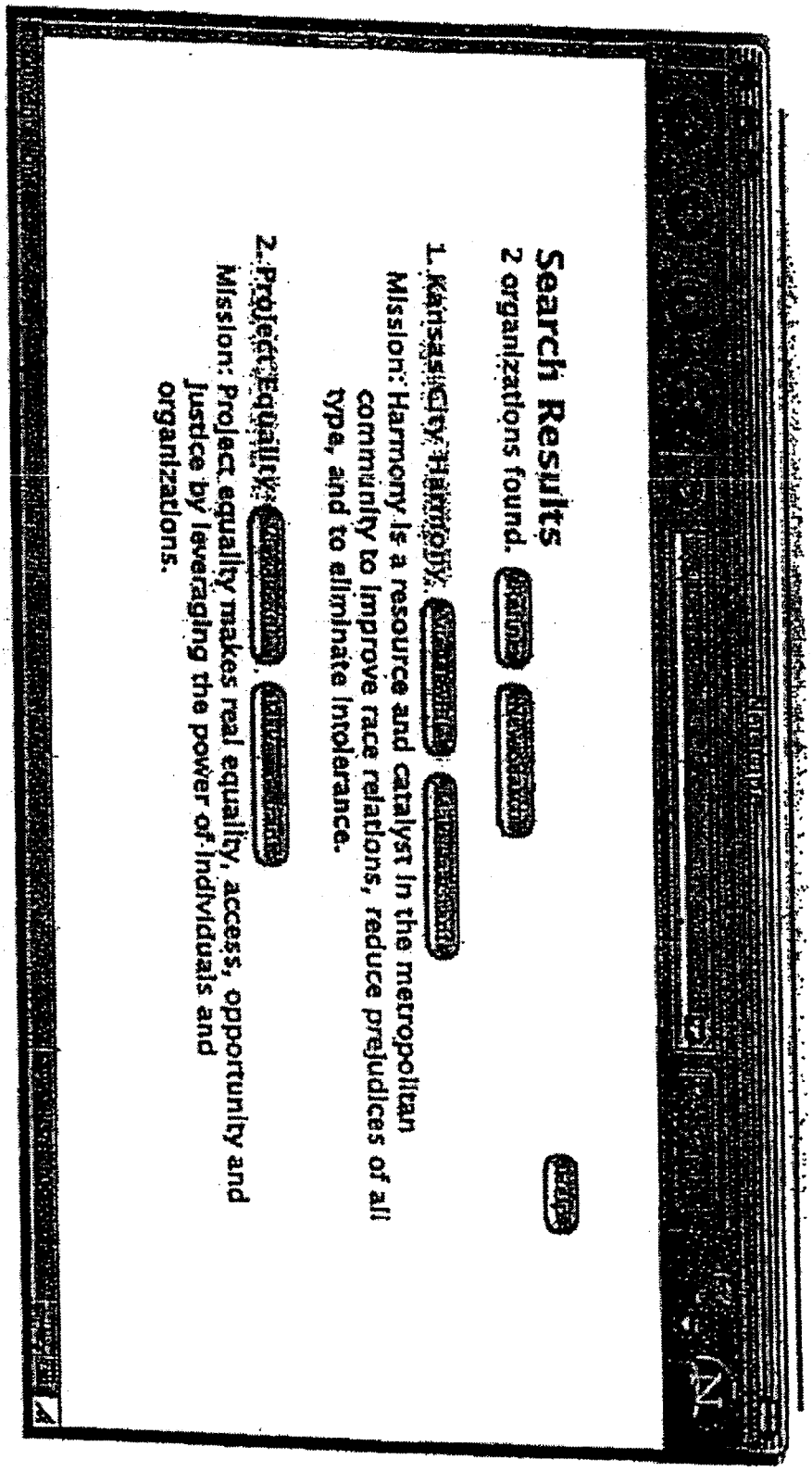
Figure 9:
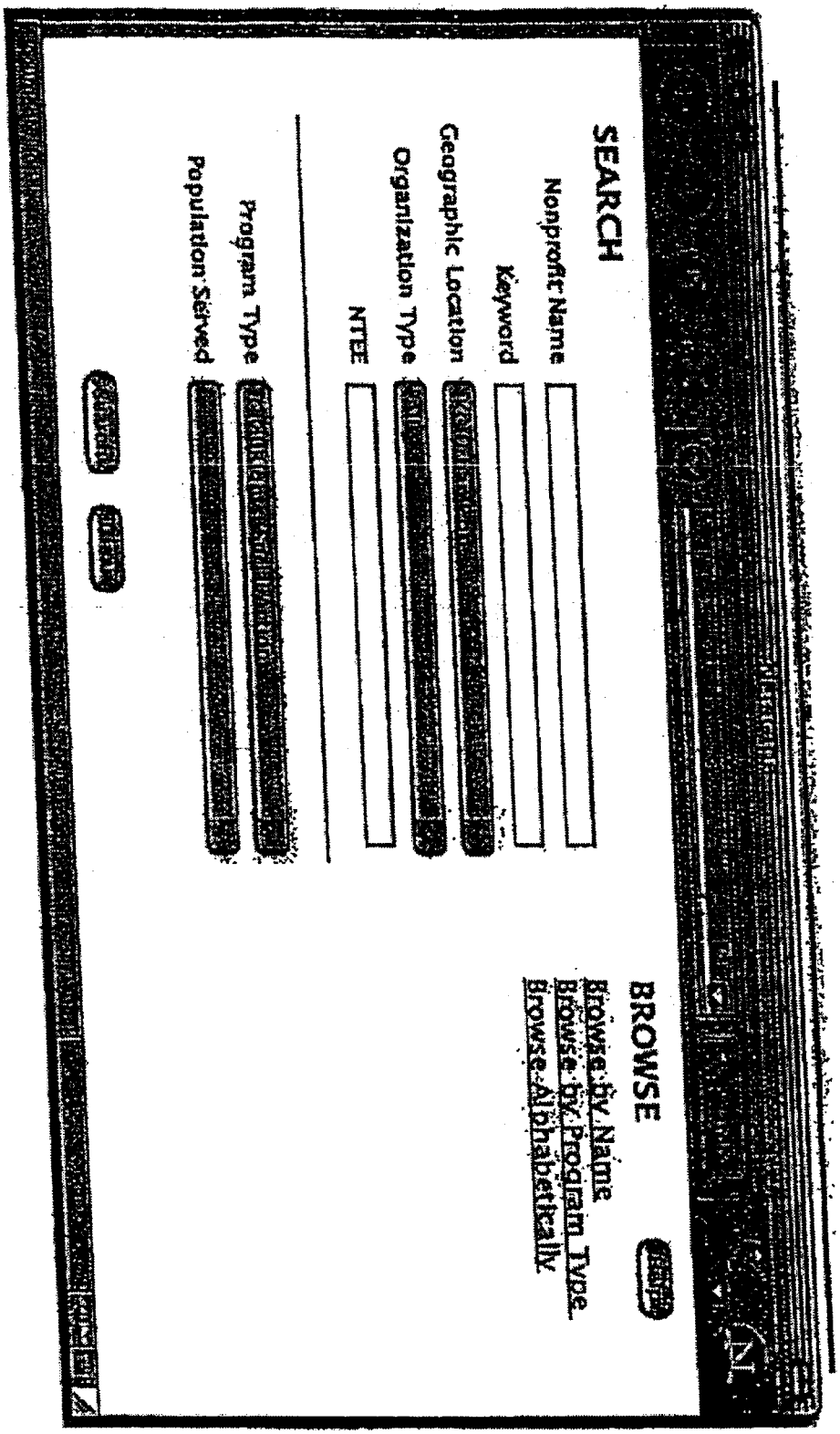

Referring now to FIGS. 7–9, a donor may select a field(s) 100 from which to search for a desired philanthropic organization at step 128. Searchable field(s) 100 includes, but is not limited to, a philanthropic organization's name, a keyword, a geographic location, an organization type, a NTEE identifier, program types, and populations served. A screen shot is shown of a search screen provided by the graphical user interface of controller 12 in FIG. 7. The donor inputs the desired information into the relevant field 100 thereby requesting controller 12 to search within the fields 100 and search criteria inputted as shown in step 130. For example, the donor may want information regarding philanthropic organizations located in the Kansas City Urban Core that focuses on civil rights and social action programs. The donor would either input or select from drop-down menus these search criteria in the geographic location and program type fields. Once the search criteria have been selected, the donor transmits them to central controller 12. This is done by clicking on a "search" button, or functionally-equivalent action, located on the search screen provided by the graphical user interface. The search criteria are received by controller 12 and checked for matches against philanthropic organization repository 42 in step 132. Philanthropic organization data 46 meeting the search criteria is then copied or otherwise transferred from repository 42 and transmitted to donor interface 16 for viewing by the donor in step 134. FIG. 8 shows a screen shot of the search results. At step 136, the donor may choose to start over and enter new search criteria in fields 100 or the donor may choose to refine the search criteria to narrow the number of results achieved. If, however, the donor is satisfied with the search results, the donor may select a particular philanthropic organization developed by the search for viewing at step 138. Once selected, a screen is provided having the data 46 applicable to the philanthropic organization selected by the donor thereon at step 140 as shown in FIG. 9. Data 46 may be provided in a report or other easily-viewable format. After viewing data 46, the donor may choose to view additional available data 46 at step 142, get a more detailed report containing data 46 at step 144, and data 46 to a list of philanthropic organizations of interest maintained as donor account data 48 at step 146, or make a donation, pledge, allocation or the like to the philanthropic organization(s) selected at 148. If the donor has elected to allocate funds, the donor inputs a request to allocate funds from the donor's account to the selected philanthropic organization at step 150. The request is transmitted to central controller 12 where an order to so allocate the donor's funds is generated at step 152. Finally, at step 154, the order is fulfilled and donor account data 48 is amended to reflect the allocation of funds to the selected philanthropic information. It will be appreciated by those skilled in the art that the order to allocate funds may include transactions actually transferring such funds from one account to another or may simply provide instructions to the operator of controller 12 that such a transfer should be initiated.

In an off-line embodiment of the present invention, donors communicate in an off-line manner with central controller 12. Rather than sending electronic mail or using web-based servers, donors use a telephone, fax machine, postal mail, or other off-line communication tool. For example, the donor may call central controller 12 and be connected with an agent. The donor may request account information data 48 or philanthropic organization data 46. The donor also provides a unique ID, username, password or private key so that central controller 12 can authenticate the donor's identity. The agent puts this data into digital form by typing it into a terminal or other input device 34 and retrieves data 46 and/or 48 to convey to the donor.

In an alternative embodiment, the donor calls central controller 12 and is connected with a conventional interactive voice response unit which allows the donor to enter an account number or other data without the aid of a live agent. The donor initially selects from a menu of subjects using the touch-tone keys of a telephone, and then the call is either directed to a live agent specializing in that subject area, or the donor is prompted for further information.

The foregoing description of the embodiments of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and modifications as are suited to the particular use contemplated. It is intended that the scope of the invention not be limited by the specification, but be defined by the claims set forth below.

We claim:

1. A method for facilitating at least one donor's management of charitable monies held in at least one donor account comprising the steps of:

(a) providing at least one central system having organization information regarding at least one philanthropic organization and donor account information regarding said at least one donor account;

(b) inputting into said system a query requesting said organization information about said at least one philanthropic organization;

(c) retrieving and displaying said organization information;

(d) inputting into said system a request to transfer said charitable monies from said donor account to said philanthropic organization;

(e) generating an order to transfer said charitable monies from said donor account to said philanthropic organization; and (f) fulfilling the generated order to complete transfer of said monies.

2. The method of claim 1 wherein said organization information is selected from the group consisting of mission statements, impact statements, backgrounds, histories, executive director statements, geographic information, management information, governance information, board of directors information, organizational infrastructure information, board of directors demographics, board of directors and management biographies, awards, recognition, national affiliations, related organizations, educations, diversity, staffing, contractors, volunteers, financial history, revenue sources, resource allocations, programs, committees, recommendations, reviews, and strategic plans.

3. The method of claim 1 wherein said organization information is displayed in a pre-defined report format.

4. The method of claim 1 further comprising the step of searching said central system for said philanthropic organization using parameters selected from the group consisting of organization name, keywords, geographic locations, organization types, program types, population served, and alphabetical.

5. The method of claim 1 further comprising the step of inputting into said system a query regarding said account information.

6. The method of claim 5 further comprising the step of retrieving and displaying said account information.

7. The method of claim 6 wherein said account information is selected from the group consisting of donor fund balance, grant history, donation history, contribution history, vouchers, investments, and associated philanthropic organization information.

8. The method of claim 1 wherein said inputting steps are performed using a computer.

9. The method of claim 1 wherein said central system comprises a computer and a repository.

10. The method of claim 9 wherein said central system further comprises a repository having said organization information therein.

11. The method of claim 9 wherein said central system further comprises a repository having said account information therein.

12. A method for developing information regarding philanthropic organizations comprising the steps of:

(a) gathering information regarding at least one philanthropic organization;

(b) interviewing said at least one philanthropic organization;

(c) confirming said information during said interviewing step;

(d) assessing said information; and (e) inputting said information into at least one central repository.

13. The method of claim 12, said information being selected from the group consisting of name, address, telephone number, mission statements, impact statements, backgrounds, histories, executive director statements, geographic information, management information, governance information, board of directors information, organizational infrastructure information, board of directors demographics, board of directors and management biographies, awards, recognition, national affiliations, related organizations, educations, diversity, staffing, contractors, volunteers, financial history, revenue sources, resource allocations, programs, committees, recommendations, reviews, and strategic plans.

14. The method of claim 12 wherein said interviewing step comprises a personal interview with a representative of said at least one philanthropic organization.

15. The method of claim 12 wherein said assessing step comprises assessing factors selected from the group consisting of said at least one philanthropic organization's future and current needs, future and current risks, outcomes, measures, fund or donation development, leadership development, interest in setting up an endowment, fund or other accounting service, and combinations thereof.

16. The method of claim 12 wherein said central repository is a computer data base.

17. The method of claim 12 further comprising the step of requesting an interview with said at least one philanthropic organization.

18. The method of claim 12 further comprising the step of receiving additional information from said at least one philanthropic organization.

19. The method of claim 12 further comprising the step of seeking review, confirmation and approval of said information from said at least one philanthropic organization prior to said inputting step.

20. The method of claim 19 further comprising the step of providing access to said information to third parties.

21. The method of claim 20 wherein said access is provided via a global computer network.

22. A method for providing information regarding philanthropic organizations to a donor comprising the steps of:

(a) providing a donor interface;

(b) logging on to a central controller from said donor interface;

(c) establishing a communication link with said central controller;

(d) inputting philanthropic organization search criteria;

(e) providing data regarding at least one philanthropic organization wherein said data corresponds to said search criteria; and (f) transmitting said data to said donor interface.

23. The method of claim 22, said logging on step further comprises inputting a unique identifier corresponding to a particular donor.

24. The method of claim 23 wherein said unique identifier is selected from the group consisting of a username, password, and combinations thereof.

25. The method of claim 23 further comprising the step of providing a donor account corresponding to said unique identifier wherein said donor account comprises donor account data.

26. The method of claim 25 wherein said donor account data is selected from the group consisting of account balance, grant history, contribution history, vouchers, investments, and combination thereof.

27. The method of claim 22 wherein said search criteria is selected from the group consisting of name, keyword, geographic location, organization type, NTEE identifier, program type, population served, and combinations thereof.

28. The method of claim 22 wherein said data is transferred from a data repository.

29. The method of claim 22 further comprising the step of refining said search criteria.

30. The method of claim 22 further comprising the step of selecting at least one philanthropic organization from said data for viewing.

31. The method of claim 30 further comprising the step of providing a report in a pre-defined format containing said data.

32. The method of claim 30 further comprising the step of adding said data to a list of preferred data maintained in said donor account.

33. The method of claim 30 further comprising the step of allocating funds from said donor account to said at least one philanthropic organization.

34. The method of claim 33 further comprising the step of transferring funds from said donor account to said at least one philanthropic organization.

35. The method of claim 23 wherein said donor interface is selected from the group consisting of a computer, personal digital assistant, pager, telephone, fax machine, and combinations thereof.

36. The method of claim 23 wherein said central controller comprises a computer, an interactive voice response unit, an operator, and combinations thereof.

* * * * *